W. S. O'BRIEN.
SLACK ADJUSTER FOR CAR BRAKES.
APPLICATION FILED MAY 7, 1913.
1,074,558.
Patented Sept. 30, 1913.
2 SHEETS—SHEET 1.
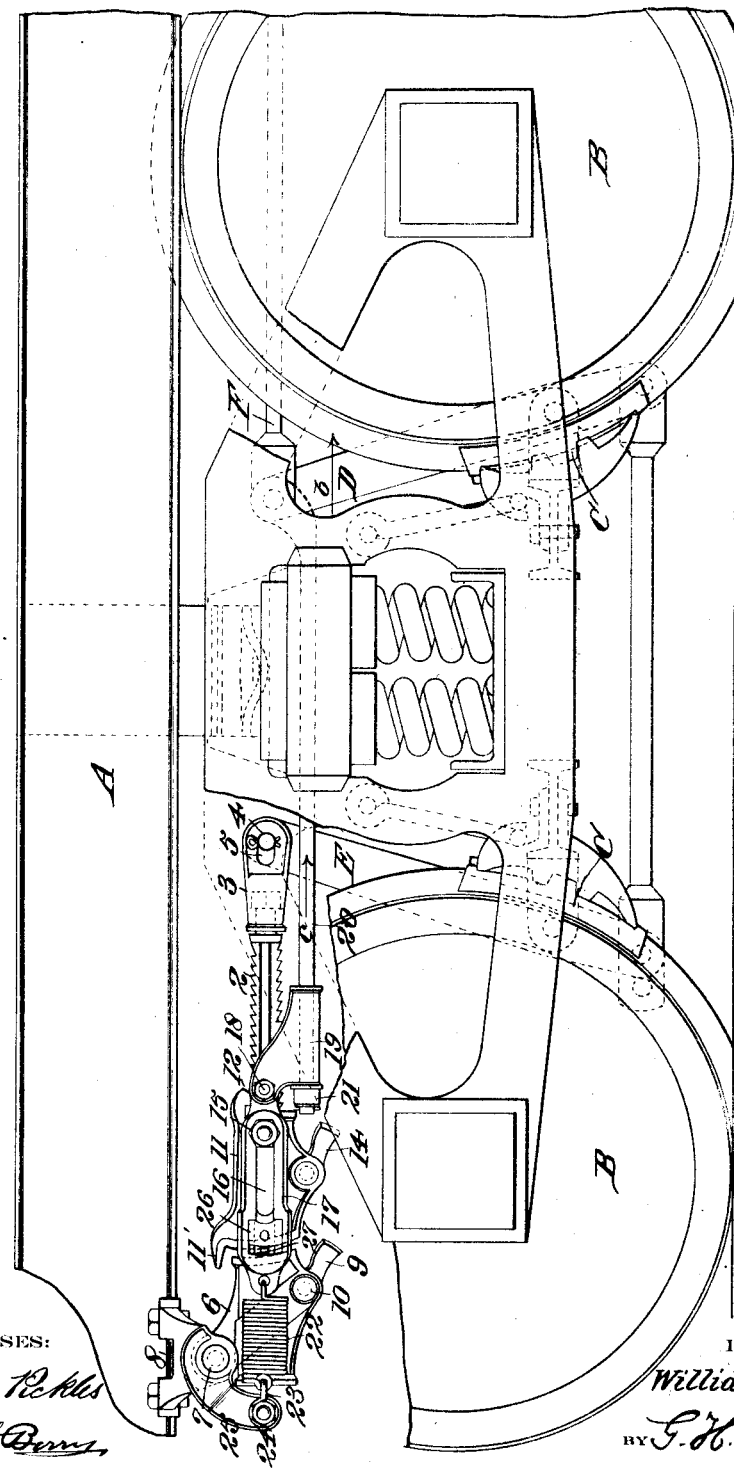
Fig. I.
WITNESSES:
INVENTOR
William S. O'Brien
BY G. H. Strong
ATTORNEY W. S. O'BRIEN.
SLACK ADJUSTER FOR CAR BRAKES.
APPLICATION FILED MAY 7, 1913.
1,074,558.
Patented Sept. 30, 1913.
2 SHEETS—SHEET 2.
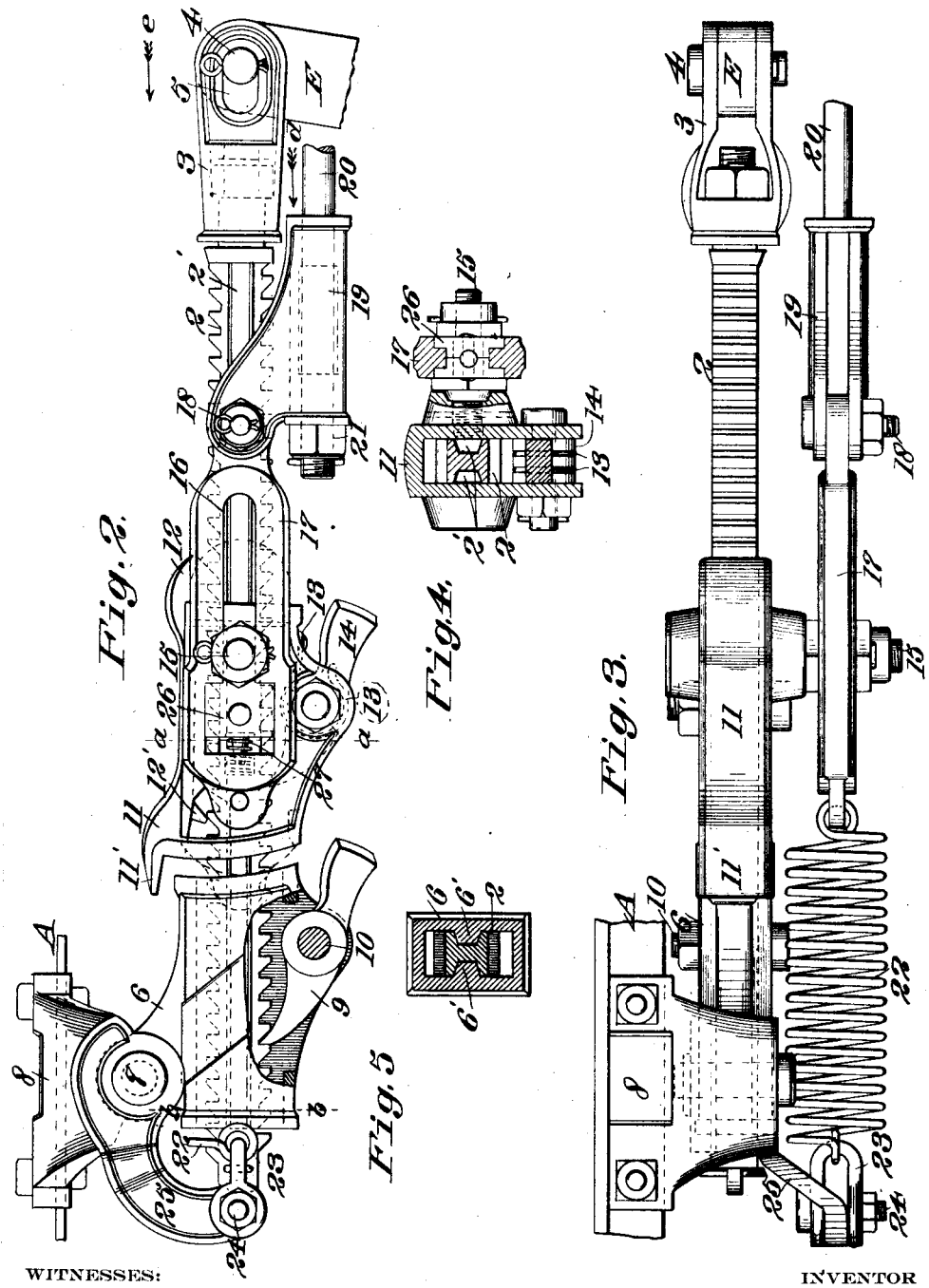
WITNESSES:
Charles Pickles
R. S. Berry
INVENTOR
William S. O'Brien.
BY G. H. Strong.
ATTORNEY

UNITED STATES PATENT OFFICE.

WILLIAM S. O'BRIEN, OF NEVADA CITY, CALIFORNIA.

SLACK-ADJUSTER FOR CAR-BRAKES.

1,074,558.  Specification of Letters Patent.  Patented Sept. 30, 1913.

Application filed May 7, 1913. Serial No. 766,065.

*To all whom it may concern:*

Be it known that I, WILLIAM S. O'BRIEN, a citizen of the United States, residing at Nevada City, in the county of Nevada and State of California, have invented new and useful Improvements in Slack-Adjusters for Car-Brakes, of which the following is a specification.

This invention relates to a slack adjuster for car brakes.

It is the object of this invention to provide a device for compensating for the wear of brake-shoes on car brakes, and to provide a reliable means by which lost motion of car brake slack, due to the wear of the brake-shoes, may be automatically adjusted.

A further object is to provide a slack adjuster which is so constructed as to obviate regulation of the brake slack by hand, and by the use of which a uniform stroke or travel of the brake piston is maintained.

Another object is to provide a means for overcoming the disadvantages met with in ordinary slack adjusters, such as allowing the live brake-levers to work forward past their proper angle, thereby reducing the braking power allowing the standard stroke or travel of the brake piston to be more or less taken up or shortened, thus causing the brake-shoes to rapidly wear out for want of proper clearance from the car wheels, and the possibility of the car wheels being slid flat by reason of the brakes being set too hard.

A further object is to provide a slack adjuster which requires no change or alteration made in the brake gear of a car, in order to be applied to the latter, and which can be easily and quickly removed when the car body or truck is to be repaired.

Further objects will appear hereinafter.

The invention primarily resides in a horizontally extending ratchet bar, pivotally connected to the upper end of a dead-brake lever, and slidably supported at its outer end in a pivoted guide housing mounted on the car sill; means carried on the guide housing for preventing longitudinal movement of the ratchet bar in one direction in relation thereto, a sleeve slidably mounted on the ratchet bar having downwardly extending projections adjacent its ends, adapted to engage teeth on the upper face of the ratchet bar, and having spring means bearing against the underside of the ratchet bar for normally maintaining the projections in the sleeve in engagement with the teeth of the ratchet bar, a pawl carried by the sleeve normally engageable with teeth on the underside of the ratchet bar, a link having slotted connection with said sleeve, means connecting said link to the live-brake lever by which the link and sleeve may be moved in one direction by the operation of the latter, and spring means acting on the link for normally retaining the link and sleeve in their rearmost positions.

The invention further consists of the parts and the construction and combination of parts as hereinafter more fully described and claimed, having reference to the accompanying drawings, in which—

Figure 1 is a side elevation, with portions broken away, of a car truck and sills, showing the slack adjuster as applied and in the released position. Fig. 2 is a side elevation of the slack adjuster, showing the parts as positioned when the brakes are fully set. Fig. 3 is a plan view of same. Fig. 4 is a detail in section on the line *a—a* of Fig. 2. Fig. 5 is a section on the line *b—b* of Fig. 2.

In the drawings A represents the sills and B the wheels or truck of an ordinary car.

C indicates brake-shoes adapted to be operated by live and dead-brake levers D and E, respectively, through the medium of a brake-rod F from any suitable source of power, such as the brake-piston, not shown, and in the usual manner. The slack adjuster comprising the present invention consists in a ratchet bar 2, having ratchet teeth formed in its upper and lower faces; the ratchet teeth on one side of the bar being staggered or offset in relation to the ratchet teeth on the other side of the bar, said bar being swivelly connected at one end to a yoke 3, pivotally attached to the upper end of the dead-brake lever E. The connection between the yoke 3 and the lever E consists of a pin 4 which passes through the lever E and projects through slots 5 formed in the yoke 3; the slots 5 and pin 4 permitting of a free rearward movement of the lever E in relation to the yoke 3. The ratchet bar 2 normally extends in a horizontal direction toward the end of the car, and has its outer end slidably supported in a guide housing 6, pivotally connected at 7 to an anchor iron 8, rigidly secured to the car sill A.

For the purpose of supporting and guiding the ratchet bar 2 in the housing 6, the latter is formed with horizontal ribs 6' on the inner face of its sides, which ribs extend into longitudinal channels 2' formed on the sides of the bar 2, as particularly shown in Fig. 5.

Mounted in the guide housing 6 is a pawl 9, which is pivoted on a bolt 10, and normally engages the lower teeth on the ratchet bar 2, to prevent longitudinal movement of the bar 2 in one direction in relation to the guide housing 6. Slidably mounted on the ratchet bar 2, adjacent the end of the guide housing 6, is a sleeve 11 through which the ratchet extends. Formed on the sleeve 11 adjacent its ends, are downwardly extending projections 12 and 12', which are formed and arranged to engage the teeth on the upper face of the ratchet bar. The projections 12 and 12' are so disposed in relation to each other that when one of the projections is engaged with a ratchet tooth the other projection will be positioned approximately midway of the length of the coacting ratchet tooth. The projections 12 and 12' are normally held in contact with the ratchet teeth and are prevented from being displaced by vibration or shock by means of a spring 13, carried by the sleeve 11 and arranged to bear against a pawl 14 mounted on the underside of the sleeve 11. The pawl 14 normally engages the ratchet teeth on the underside of the bar 2 and bears against the latter by virtue of a spring 13 with sufficient force to maintain either the projection 12 or 12' and the outer end of the pawl 14 in engagement with the ratchet bar 2. The sleeve 11 is thus mounted to have movement in but one direction in relation to the ratchet bar 2. Projecting laterally from one side of the sleeve 11 is a stud 15, which passes through a horizontal slot 16 formed in a link 17, one end of which is pivotally connected at 18 to a sleeve 19, slidably mounted on the end of the connecting rod 20, which leads to and is connected with the live-brake lever D. A nut 21 is screwed on the outer end of the connecting rod 20, and is adapted to advance the sleeve 19 when the connecting rod 20 moves in the direction indicated by arrow c, in Fig. 1. The outer end of the link 17 is attached to a helical spring 22, which is secured at its outer end to a clevis 23, pivotally connected at 24 to a bracket 25, formed on the anchor iron 8. The spring 22 operates to normally exert a longitudinal pull on the link 17 in opposition to the connecting rod 20. Slidably mounted in the enlarged end of the slot 16 is a buffer block 26, which is normally caused to bear against the stud 15 by the action of a spring 27 interposed between the end of the slot 16 and the buffer block 26, as shown in Fig. 2. The buffer block 26 is provided for the purpose of breaking the impact of the stud 15 with the end of the slot 16 when the link 17 travels to the limit of its movement in one direction. The spring 22, exerting a pull on the link 17, operates to normally retain the latter in the position indicated in Fig. 1, with the inner end of the slot 16 adjacent the stud 15 when the brakes are in the released position. The inner end of the slot 16, engaging the stud 15 at this time, will cause the spring 22 to exert a pull on the sleeve 11, tending to retain the latter in its rearmost position against the end of the pivoted housing 6, the latter serving as an abutment for the sleeve 11. A guard 11' is formed on the upper edge of the sleeve 11 and extends over the point between the sleeve 11 and the guide housing 6 to prevent gravel or dirt falling therebetween.

In the operation of the invention the live brake lever D is moved in the direction of the arrow b in Fig. 1, to set the brakes, thus moving the connecting rod 20 in the direction of the arrow c in Fig. 1; which, by reason of its engagement with the sleeve 19 causes the link 17 to move therewith the length of the slot 16; the buffer block 26 breaking the impact between the outer end of the slot 16 and the stud 15 when the distance of travel of the connecting rod 20 is great enough to cause the link 17 to move a distance greater than the length of its slot 16. This occurs when the brake-shoes are sufficiently worn to permit of an increased movement of the brake-rod F and connecting rod 20. When this occurs the sleeve 11 will be caused to move by reason of its engagement with the link 17, so as to advance the projections 12—12' and the pawl 14 into a new position on the ratchet bar 2, the parts being then disposed in the position shown in Fig. 2. On the release of the brakes, the connecting rod will move in the direction of the arrow d in Fig. 2, and the upper end of the dead-brake lever will move in the direction of the arrow e in Fig. 2. This will allow the spring 22 to restore the link 17 to its normal position, and if the sleeve 11 has been advanced sufficiently far on the ratchet bar 2 the spring 22 will operate through the link 17 and sleeve 11 to advance the ratchet bar 2 into the guide housing 6, where it will be engaged by the pawl 9 and held against retraction.

From the foregoing it will be seen that I have provided a simple and efficient device for taking up the slack of brake mechanism, to compensate for the wear of the brake-shoes.

Having thus described my invention, what I claim and desire to secure by Letters Patent is:

1. In a slack adjuster, the combination of a ratchet bar pivotally connected to a brake-lever, a pivoted guide housing in which the outer end of said bar is slidably mounted, a pawl in said guide housing normally engaging the teeth of the ratchet bar, a sleeve slidably mounted on the ratchet bar and normally engaged therewith, a link having a slotted connection with said sleeve, a spring connecting one end of the link to a rigid support, and a connection between the link and the brake-operating lever adapted to reciprocate the link in one direction when the brakes are set.

2. In a slack adjuster, the combination with a dead-brake lever and a live-brake lever, of a ratchet bar connected to the dead-brake lever, means for engaging the bar to prevent its movement in one direction, and adapted to permit of its movement in the opposite direction, a sleeve slidably mounted on said ratchet bar, means for normally connecting the sleeve to the bar, a stud on said sleeve, a slotted link supported on said stud, a spring normally exerting a pull on one end of said link, and connections between the opposite end of the link and the live-brake lever adapted to reciprocate the link in opposition to the spring when the brakes are operated.

3. In a slack adjuster, the combination with a dead-brake lever and a live-brake lever, of a ratchet bar connected to the dead-brake lever, means for engaging the bar to prevent its movement in one direction, and adapted to permit of its movement in the opposite direction, a sleeve slidably mounted on said ratchet bar, means for normally connecting the sleeve to the bar, a stud on said sleeve, a slotted link supported on said stud, a spring normally exerting a pull on one end of said link, connections between the opposite end of the link and the live-brake lever adapted to reciprocate the link in opposition to the spring when the brakes are operated, and a buffer carried by the link arranged to absorb the shock or impact between the link and the stud on the sleeve.

4. A slack adjuster comprising a slotted link adapted to be reciprocated in one direction on the operation of the brakes, spring means for reciprocating the link in the opposite direction when the brakes are released, a ratchet bar paralleling the link and spaced therefrom, a sleeve slidably mounted on said ratchet bar, slidable connections between the link and said sleeve, means for limiting the movement of the ratchet bar in one direction, a connection between the ratchet bar and the dead-brake lever, and means on the sleeve for engaging the ratchet bar and adapted to advance the latter in one direction to take up the slack.

5. A slack adjuster comprising the combination of an anchor iron adapted to be attached to a car sill, a guide housing pivoted to said anchor iron, a ratchet bar extending into said guide housing, a pawl on said housing normally engaging said ratchet bar, a connection between the inner end of the ratchet bar and the dead-brake lever, a sleeve slidably mounted on the ratchet bar, a pawl carried by said sleeve normally engaging the ratchet bar, means for advancing the sleeve on the ratchet bar on the operation of the brakes when there is slack in the brake-operating mechanism, and means for advancing the ratchet bar in the guide housing to take up the slack in the brake mechanism.

In testimony whereof I have hereunto set my hand in the presence of two subscribing witnesses.

WILLIAM S. O'BRIEN.

Witnesses:
JOHN H. HERRING,
W. W. HEALEY.